Dec. 31, 1957  C. C. POWELL  2,818,173
AUTOMATIC EGG SCALE
Filed July 26, 1955  2 Sheets-Sheet 1
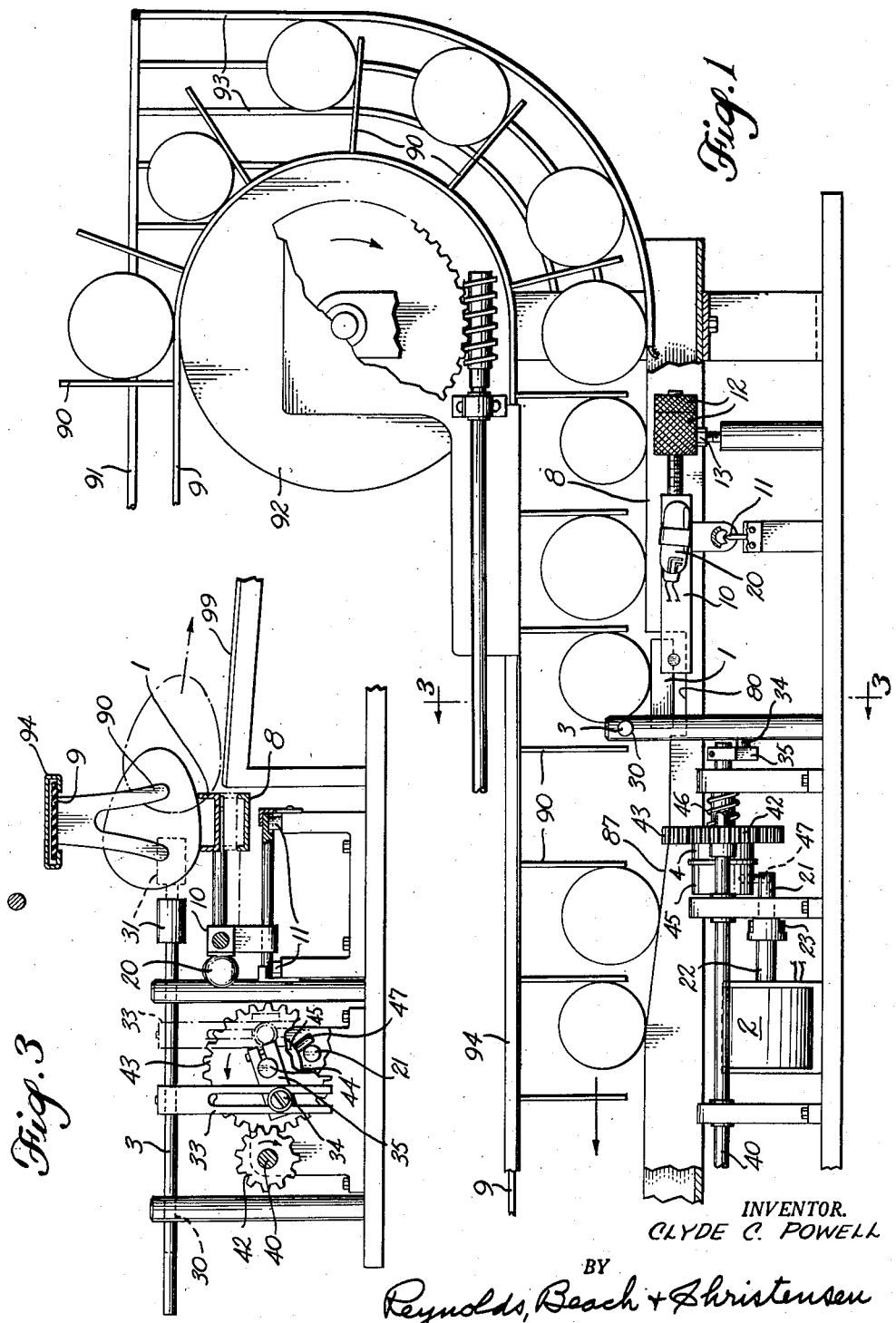
INVENTOR.
CLYDE C. POWELL
BY
Reynolds, Beach & Christensen
ATTORNEYS Dec. 31, 1957 C. C. POWELL 2,818,173
AUTOMATIC EGG SCALE
Filed July 26, 1955 2 Sheets-Sheet 2
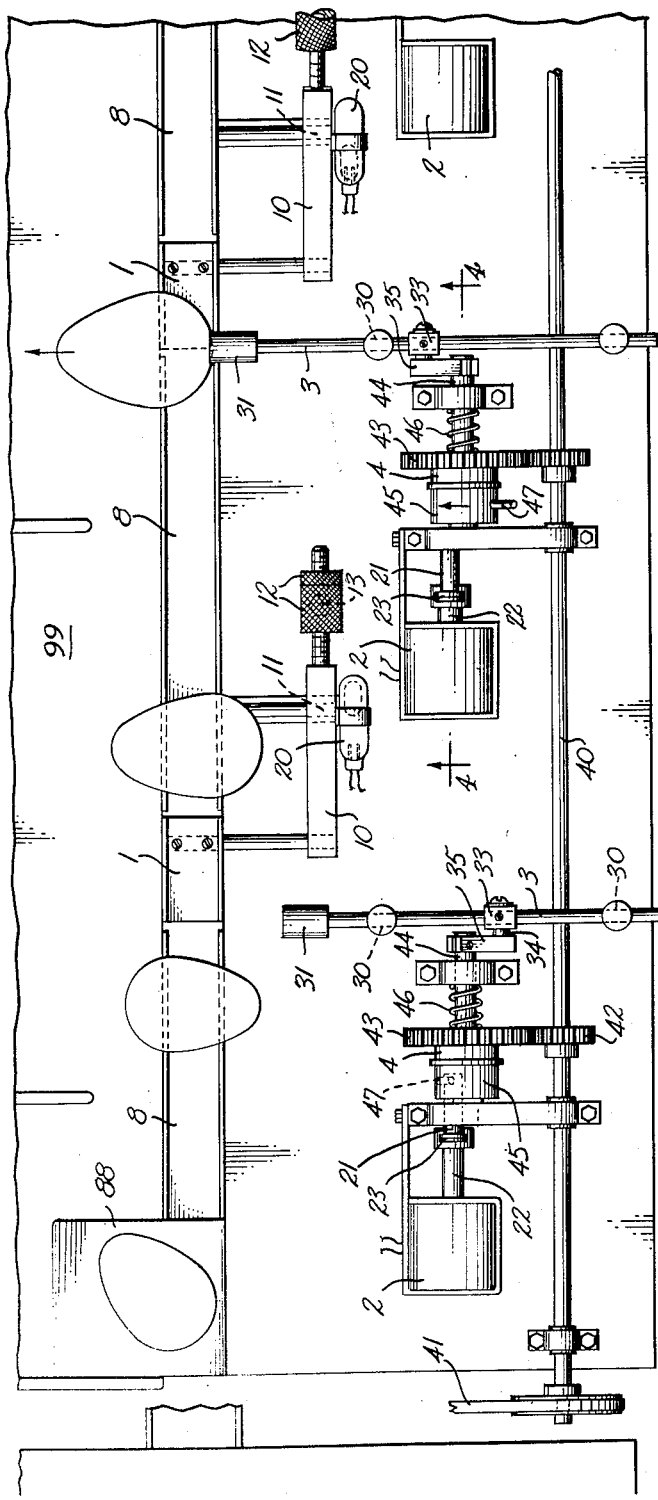
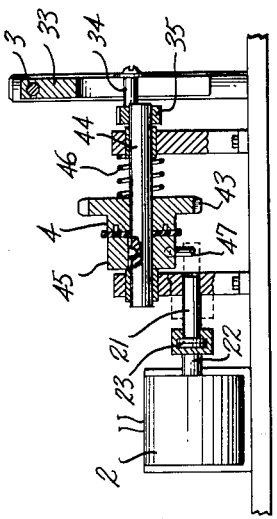
INVENTOR.
CLYDE C. POWELL
BY Reynolds, Beach
+ Christensen
ATTORNEYS United States Patent Office 2,818,173
Patented Dec. 31, 1957

2,818,173

AUTOMATIC EGG SCALE

Clyde C. Powell, Bellevue, Wash., assignor to National Poultry Equipment Company, Renton, Wash., a partnership Application July 26, 1955, Serial No. 524,436

5 Claims. (Cl. 209—121)

There are in existence automatic egg cleaning machines, wherein eggs are advanced slowly by rolling along a track, and as they pass rotating cylinders, they are abraded to remove surface dirt. An example of such a machine is illustrated in my Patent No. 2,554,878, dated May 29, 1951, and in a later form in my copending application Serial No. 310,892, filed September 22, 1952, now Patent No. 2,714,786, dated August 9, 1955. Such machines heretofore have accomplished only the function of cleaning the eggs, although it has been proposed also to associate candling devices so that the latter function also is accomplished. However, it has always been necessary, so far as I am aware, to weigh the eggs separately, and so to grade them as to size. This involves added handling of each individual egg, and requires much time and close attention on the part of the person doing the grading. It is a primary object of the present invention to provide, in association with such an automatic egg cleaning machine, an automatic egg scale whereby the eggs, after being cleaned and after candling, if that function is also associated, are individually weighed, and segregated into grades according to weight, without further attention from the operator.

In grading eggs as to weight, they are normally graded in at least three sizes—large, medium, and small—and often two or even three additional sizes are provided, namely, extra large, jumbo, and peewee. Each such grade requires a dozen eggs to weigh a given number of ounces, but the differences are not great, and when divided among twelve eggs, the difference in weight per egg is quite small, hence, the scales must be delicate and the weight determination must be quite accurate, both in order to avoid, on the one hand, downgrading of the entire lot for failure to maintain the minimum weight per grade, or, on the other hand, to avoid economic loss to the poultryman by giving greatly excess weight per dozen for a given grade. It is a further object of this invention to provide an automatic egg scale of the general nature indicated above, in which the weight determination of each egg is very accurately accomplished, and each egg, as it reaches the proper station for its grade, is automatically removed from the track along which it is traveling, and deposited in the bin that holds other eggs of the same weight.

In general, the machine of this invention makes use of the track along which the eggs travel through the cleaning machine, and causes them to travel a further distance along that track, and over successive scale platforms, which, in effect, are part of the track, in order to depress that particular one of the several scale platforms which corresponds to the weight of each individual egg. Since the eggs travel closely spaced through the machine as a whole, means are provided at each successive station, in conjunction with the scale platform at that station, for removing the egg which depresses the scale platform, but to permit other, lighter, eggs to pass on beyond. Removal must be done promptly while the egg is passing a given station, and although the eggs do not travel rapidly, it still is necessary that the determination be quickly made and the removal of the egg be promptly accomplished. Accordingly, it is a further object of this invention to provide a means which in effect is continuously energized but withheld from movement, to push or otherwise remove the egg from the platform or the track along which it is moving, automatically upon depression of a corresponding platform.

Also, it is an object of this invention to provide mechanism of the character indicated above which shall be simple and compact, rugged and reliable, and needing little attention, service, or replacement throughout the life of the egg cleaning machine.

With these and other objects, such as will appear more fully hereinafter, this invention comprises the novel automatic egg scale and the novel combination and arrangement of the parts thereof with relation to each other and with relation to the automatic egg cleaning machine and its track, all as are shown in the accompanying drawings, and as will be explained more fully hereinafter and defined in the appended claims.

Figure 1 is a side elevational view, partly broken away, of a portion of the egg track and a single egg weighing station.

Figure 2 is a plan view of two such stations, one being shown in an operative condition and the other, inoperative.

Figure 3 is a transverse sectional view on the line indicated at 3—3 of Figure 1, illustrating the egg-engaging and removing mechanism, with parts thereof broken away.

Figure 4 is a sectional view substantially on the line 4—4 of Figure 2, illustrating primarily the continuously driven clutch mechanism.

The eggs are advanced through the cleaning machine such as that disclosed in my patents referred to above, as they rest upon a slowly traveling belt 9, having upstanding fingers 90 defining individual egg spaces and pushing the egg along. There may be also spaced rails defining a track, but a showing thereof is unnecessary to an understanding of the present invention. Side guides 91 are also provided to prevent the egg from moving laterally off the belt 9. As the eggs advance through the egg cleaning machine they are abraded, as is made clear in my patents referred to above. The egg scale of the present invention would normally be located beyond the discharge end of the egg cleaning machine, and instead of discharging the eggs directly onto a common table to be thereafter weighed individually, they are carried around the drive pulley 92, restrained by a cage 93, until they reach the lower run of the belt 9. The belt is guided in a longitudinal guide 94, and in this lower run the eggs rest upon a track, generally designated by the numeral 8, which may take the form of a channel with its spaced-apart flanges directed upwardly. The eggs roll along the track 8 with their major axes directed transversely of the track, as they are pushed along by the pusher fingers 90. The track 8 is of such length as may be necessary to encompass the required number of grading stations, usually not less than two and usually not more than five (the final station is not strictly a grading station, but a station to remove and receive all remaining eggs that were too light to depress the successively encountered scale platforms).

At each station, a scale platform 1 of a shape conforming generally to the shape of the track is positioned as a continuation or segment of the track, which preferably is notched as indicated at 80 (Figure 1), so that the scale platform 1 may move vertically. Since the platform 1 is part of a scale mechanism, it may be guided and it may be caused to rise and fall, and to remain yieldingly elevated, by any suitable mechanism. Preferably, however, the platform 1 is mounted at one end of a scale beam 10, pivotally balanced upon a knife edge at 11 and carrying at its other end adjustable weights 12, whereby the platform 1 may be held elevated in general alignment with the track 8 until an egg of sufficient weight to overcome the particular counterweight 12 of its scale beam rolls over the platform 1. Adjustable stop means 13 retain the scale beam in this upraised position.

Also carried upon the scale beam is an energizing device such as a mercury switch 20, which may also be considered as part of an actuator mechanism to be described later, and which is energizable only when the scale beam 10 with the mercury switch 20 is tilted by the depression of its scale platform 1. In the upraised position the mercury switch 20 is open, and hence the actuator is de-energized.

The actual egg-engaging means for effecting removal of the egg constitutes an element which is normally retracted from egg-engaging position, but which can be moved upon energization of the actuator means hereinabove referred to, into a position to engage the egg and to remove it from the track. Such an egg-engaging means might take various forms. Conveniently, it has been found possible to employ a rod 3, guided at 30 for rectilinear movement in a direction transverse to the track, the end of the rod nearer the track being provided with a cushioned pusher head 31, which when pushed toward the track will move far enough to engage any egg which may be in its path, and will push this egg endwise, that is, in a direction transverse to the track, off the track and onto an apron 99, down which it will roll into a bin. Each rod 3 carries a yoke 33 by which endwise movement of the rod 3 can be accomplished upon rotation of a pin 34 (Figure 3) about its axis 44, the pin 34 being at the outer end of a crank arm 35. A single rotation of the pin 34 will advance the pusher 31 into egg-engaging position and will retract it from that position.

A line shaft 40, driven by a belt 41 or in any other suitable way, extends past the several egg weighing stations. At each station it carries a driving gear 42 which meshes with a driven gear 43, integral with a collar 4. The driven gear 43 and its collar 4 constitutes a continuously rotative driving element of a clutch means, which driving element is in continuous frictional engagement with a driven clutch element 45. The latter is keyed to a jack shaft 44, whereas the driven gear 43 is loose on that shaft. A spring 46 urges together the driving and driven clutch elements 4 and 45, respectively, and they are formed of such materials as will permit such continuous frictional engagement, but will not wear appreciably as a result thereof, yet as soon as the driven clutch element 45 is free to rotate, will effect rotation thereof, and of the jack shaft 44 to which clutch element 45 is keyed.

Rotation of the driven clutch element 45 and jack shaft 44 is normally prevented by a stop means, which includes a pin 47 projecting radially from the clutch element 45 and rotative with the latter, and a spindle 21 which is a part of the actuator mechanism. This spindle is guided for movement into and from the rotative path of the pin 47, as is shown best in Figure 4. When projected within the path of the pin 47, as it is normally by a spring (not shown) active to project the solenoid core referred to below, rotation of the driven clutch element 45 is prevented; when retracted or withdrawn from the pin 47, the rotative clutch element 45 is free to and does rotate. Moreover, being of small inertia and continuously urged to rotate, rotation begins very promptly, before the actuator means can be deenergized by reopening of switch 20.

The actuator means includes an electric motor device such as the solenoid 2. The spindle 21 is operatively connected to the solenoid core 22 in such manner that the spindle 21 will reciprocate with the solenoid core, as the solenoid is energized and deenergized. The arrangement preferably is a readily disconnectible one, such as the T-head 23 (see Figure 2) in which complemental parts on the spindle 21 and the core 22 interengage by movement transverse to their axis. The solenoid 2 is electrically connected to the tilting mercury switch 20 so that the solenoid is energized whenever the mercury switch is tilted with the scale beam 10 from the normal upraised position of the scale platform 1 into a depressed position, caused by an egg of sufficient weight crossing the scale platform.

As the eggs reach the track 8, they roll along the same, being advanced by the pusher fingers 90. The eggs need not be oriented with the small end in any particular direction, but for rolling all should be disposed (and will naturally assume a position) with their major axes transversely of the track. As they roll along the track, with the various sizes mixed randomly, each individual egg passes singly across the first scale platform 1 in the series along the track. If the egg is of the largest and heaviest size being graded, it will depress this first scale platform, the mercury switch thereof will be closed, and the corresponding solenoid 2 will be energized, whereupon, the spindle 21 being withdrawn from the stop pin 47, the driven clutch element 45 will be free to rotate and will immediately begin rotating. This, through the crank arm 35, advances the rod 3, and the latter is located at such a position that the egg on the depressed platform 1, or just about to pass therefrom, is engaged by the pusher head 31 and is gently shoved transversely of the track and off the track, in the manner indicated by the dot-dash lines in Figure 3. Immediately the scale platform rises again, the mercury switch is opened, and before the pin 47 has completed one revolution, the solenoid 2 is deenergized, and its built-in return spring returns the spindle 21 into the rotative path of the pin 47, stopping the driven clutch element 45 after one complete rotation. The driving clutch element 4, however, continues to rotate.

Eggs following this first and heaviest egg will pass over the first scale platform, unless they, too, are of such weight as to depress that platform. As they reach successive platforms, they will pass across the same, and when the platform is reached which is depressed by the weight of the particular egg passing across it, this platform, too, is depressed, and the egg that depresses it is pushed off as described above. If an egg should be of such light weight that it eventually passes all the platforms without depressing any thereof, it will reach an inclined apron 88 (see Figure 2), and being no longer balanced on the track 8, will roll off along the apron 88, and into the bin provided for the smallest size of eggs. The different sizes of eggs have been indicated somewhat exaggeratedly in the drawings.

It will be noted in Figure 1 that the track 8 includes high level portions and upwardly inclined portions 87 leading from low level portions. It will be realized that when an egg depresses a given platform 1, it may start to roll onto the track beyond the platform before the pusher 3 has quite completed its removal from the track, and so it is necessary that the track be at the level of the lowest point to which the platform 1 is likely to be depressed. The slight drop off a platform which is not depressed onto the lower level portion of the track will not injure the smaller eggs which pass across such a platform.

I claim as my invention:

1. In combination with a track interrupted at intervals corresponding to weighing stations, and scale platforms located at each weighing station and constituting a continuation of the track, for guidance of articles to be weight-graded and which are advancing singly along such track, means at the successive weighing stations sensitive to graduated weights, to maintain the successive platforms elevated until depressed by an article of a weight at least equal to the weight to which a given platform is sensitive, a kicker located alongside the track, at each weighing station, driving means continuously driven, driven means operatively connected to each kicker, and positioned in continuous driving engagement with the driving means, means to restrain movement of each driven means, and means at each weighing station operatively connected to the corresponding scale platform, and energizable by depression thereof to withdraw the corresponding restraining means, for movement of the corresponding kicker momentarily into and from article-engaging position.

2. The combination of claim 1, wherein the kicker comprises a rod constituting a pusher, and guiding means therefor comprising guides arranged adjacent and transversely of the track and receiving and supporting said rod for rectilinear movement.

3. In combination with a track upon which eggs rest and along which they travel singly in spaced relationship, a plurality of vertically movable scale platforms located at intervals as segments of said track, weight-sensitive means to maintain each platform elevated until an egg of a particular weight, individual to each such platform and its associated weight-sensitive means, depresses the same, a member positioned at each platform and movable in a predetermined path to engage and remove an egg while passing such platform, but normally retracted from egg-engaging position, clutch means including a driving element and a driven element in continuous driving engagement, the driven element being operatively connected to said egg-engaging member for moving the latter, means normally positioned to prevent movement of said driven member, energizing means operatively connected to each platform and held by the latter in inactive position, but movable into energizing position by depression of the platform, means operatively associated with said energizing means for shifting said movement-preventing means from its normal position and thereby to allow conjoint movement of the driving and driven elements of said clutch means, upon movement of the energizing means into its active position.

4. In combination with a track whereon eggs rest and along which they travel singly in spaced relationship; a plurality of vertically movable scale platforms located at individual stations along the track, and constituting segments of said track; weight-sensitive means to maintain each platform elevated until an egg which exceeds a particular weight, individual to each such platform and its associated weight-sensitive means, depresses the same; a continuously driving clutch element at each station, and a complemental driven clutch element in continuous driving engagement with said driving element; stop means to hold the driven clutch element in a given position; a pusher at each station guided for movement transversely of the track, and yieldingly held in retracted position, but movable to engage and push from the track a passing egg; means operatively connected between said driven clutch element and said pusher to enable movement of the latter, upon release of the former, to engage an egg and for retraction; and means operatively connected between said scale platform and the stop means to withdraw the latter from holding position upon depression of the scale platform.

5. The combination of claim 4, wherein the driving and driven clutch elements are rotative, and the stop means comprises a pin rotative with the driven clutch element and a spindle guided for movement into and from the rotative path of said pin, and wherein the operative connection between the scale platform and the stop means comprises a solenoid energizable to withdraw said spindle from the path of the pin, and switch means shiftable by depression of the scale platform to energize said solenoid.

References Cited in the file of this patent

UNITED STATES PATENTS

| | | |
|---|---|---|
| 603,413 | Stearns | May 3, 1898 |
| 1,999,827 | Wardley | Apr. 30, 1935 |
| 2,065,888 | Du Brul et al. | Dec. 29, 1936 |
| 2,112,259 | Wyland | Mar. 29, 1938 |
| 2,116,895 | Howard | May 10, 1938 |
| 2,197,381 | Mansbendel | Apr. 16, 1940 |
| 2,307,695 | Mansbendel | Jan. 5, 1943 |
| 2,371,077 | Strauss | Mar. 6, 1945 |
| 2,579,602 | Niederer et al. | Dec. 25, 1951 |
| 2,645,344 | Hayter | July 14, 1953 |